(12) United States Patent
Takenaka et al.

(10) Patent No.: US 8,678,118 B2
(45) Date of Patent: Mar. 25, 2014

(54) VEHICLE DRIVE DEVICE

(75) Inventors: Masayuki Takenaka, Anjo (JP);
Atsushi Teshima, Toyota (JP); Ryuta Ishida, Okazaki (JP); Tomohiko Miyamoto, Toyota (JP)

(73) Assignees: Aisin Aw Co., Ltd., Anjo (JP); Toyota Jidosha Kabushiki Kaisha, Toyota-Shi (JP)

( * ) Notice: Subject to any disclaimer, the term of this patent is extended or adjusted under 35 U.S.C. 154(b) by 496 days.

(21) Appl. No.: 13/059,838

(22) PCT Filed: Aug. 20, 2009

(86) PCT No.: PCT/JP2009/065276
§ 371 (c)(1),
(2), (4) Date: Feb. 18, 2011

(87) PCT Pub. No.: WO2010/021413
PCT Pub. Date: Feb. 25, 2010

(65) Prior Publication Data
US 2011/0139522 A1 Jun. 16, 2011

(30) Foreign Application Priority Data

Aug. 22, 2008 (JP) ................................. 2008-214633

(51) Int. Cl.
*B60K 1/02* (2006.01)

(52) U.S. Cl.
CPC ........................................ *B60K 1/02* (2013.01)
USPC ......................................... 180/65.6; 180/65.1

(58) Field of Classification Search
CPC ................................. B60W 20/00; B60K 1/02
USPC ............ 180/65.1, 65.21, 65.22, 65.24, 65.31, 180/65.6
See application file for complete search history.

(56) References Cited

U.S. PATENT DOCUMENTS 3,439,767 A * 4/1969 Lynes et al. ...................... 180/60
3,477,538 A * 11/1969 Hall et al. ..................... 180/65.1
(Continued)

FOREIGN PATENT DOCUMENTS

DE 44 34 237 A1 3/1996
DE 102 19 922 A1 11/2003
(Continued)

OTHER PUBLICATIONS

International Search Report issued in International Application No. PCT/JP2009/065276 on Oct. 1, 2010.

(Continued)

*Primary Examiner* — Hau Phan
*Assistant Examiner* — Jacob Meyer
(74) *Attorney, Agent, or Firm* — Oliff PLC

(57) ABSTRACT

A vehicle drive device having two independent systems provided for two driving wheels, respectively, each system including a rotating electrical machine, an output member to be connected to a corresponding driving wheel, and a drive transmission system. The transmission also includes a counter deceleration mechanism, which connects the rotating electrical machine and the output member to each other. A case integrally accommodates the rotating electrical machines, the output members, and the drive transmission systems of the two systems. The rotation axes are provided so that their respective rotation axes are parallel to each other, and are positioned so as to overlap each other in the rotation axis direction. The rotating electrical machine of each system is provided with an output portion located on one side of the rotating electrical machine which is distal from the corresponding driving wheel in the rotation axis direction of the rotating electrical machine.

21 Claims, 4 Drawing Sheets

(56) References Cited

U.S. PATENT DOCUMENTS

| | | | | |
|---|---|---|---|---|
| 5,419,406 | A * | 5/1995 | Kawamoto et al. | 180/65.6 |
| 5,931,757 | A * | 8/1999 | Schmidt | 475/2 |
| 5,947,855 | A * | 9/1999 | Weiss | 475/5 |
| 6,615,946 | B2 * | 9/2003 | Pasquini et al. | 180/248 |
| 7,083,015 | B2 * | 8/2006 | Ruppert et al. | 180/65.1 |
| 7,363,995 | B2 * | 4/2008 | Downs et al. | 180/65.1 |
| 8,113,307 | B2 * | 2/2012 | Holland | 180/65.1 |
| 8,479,851 | B2 * | 7/2013 | Mack et al. | 180/65.6 |
| 2010/0236845 | A1 * | 9/2010 | Ishii et al. | 180/65.6 |
| 2011/0000721 | A1 * | 1/2011 | Hassett et al. | 180/65.22 |

FOREIGN PATENT DOCUMENTS

| | | |
|---|---|---|
| EP | 0 794 104 A2 | 9/1997 |
| GB | 1179141 | 1/1970 |
| JP | A-5-116542 | 5/1993 |
| JP | U-5-65641 | 8/1993 |
| JP | A-9-240477 | 9/1997 |
| JP | A-2000-324767 | 11/2000 |
| JP | A-2005-199894 | 7/2005 |
| WO | WO 03/032472 A1 | 4/2003 |
| WO | WO 2004/016459 A1 | 2/2004 |

OTHER PUBLICATIONS

Written Opinion of the International Searching Authority issued in International Application No. PCT/JP2009/065276 on Oct. 1, 2010.
European Office Action issued in EP 09 737 167.8 dated Aug. 1, 2011.
Partial translation of Notification of Reasons for Refusal issued in Japanese Patent Application JP2008-214633 mailed Apr. 12, 2012.

* cited by examiner

F I G. 1
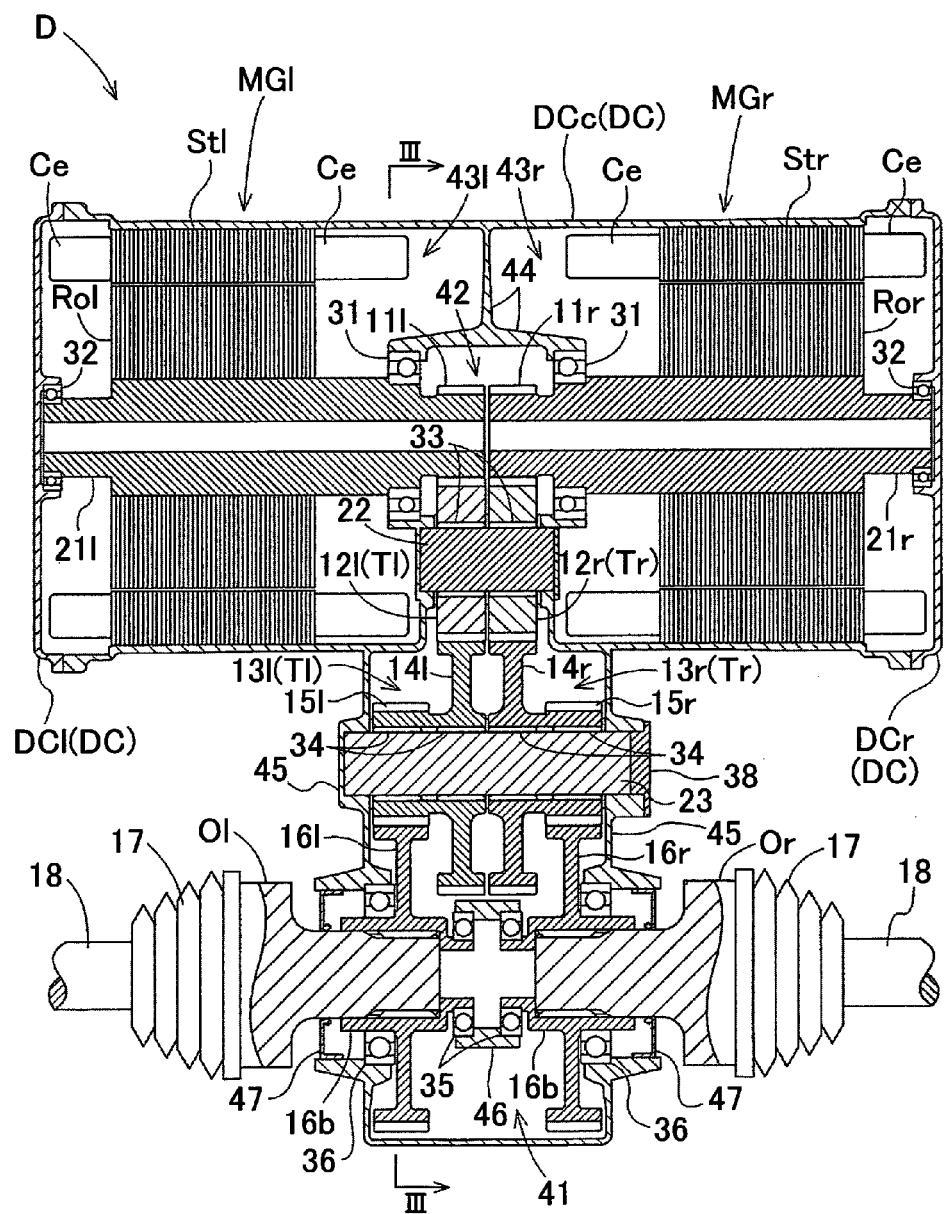

VEHICLE DRIVE DEVICE

TECHNICAL FIELD

The present invention relates to the structure of drive devices for use in vehicles including a rotational electrical machine as a driving force source, such as, for example, electric vehicles and hybrid vehicles.

BACKGROUND ART

Various structures have been proposed regarding drive devices for vehicles including, as a driving force source, a rotating electrical machine capable of functioning as a motor, such as, for example, electric vehicles and hybrid vehicles. The structure including independent rotating electrical machines for driving two driving wheels is already known in the art.

For example, a vehicle drive device described in Japanese Patent Application Publication No. JP-A-H05-116542 includes left and right output members respectively connected to left and right driving wheels, left and right rotating electrical machines respectively drivingly connected to the left and right output members, and left and right deceleration devices each formed by a planetary gear mechanism provided between the corresponding output member and the corresponding rotating electrical machine. The output members, the rotating electrical machines, and the deceleration devices are provided coaxially in this vehicle drive device. Since this vehicle drive device is structured to include independent rotating electrical machines for the right and left driving wheels, respectively, the rotating electrical machines is reduced in size and weight, and the transmission efficiency of the driving force is improved, as compared to the case where the left and right driving wheels are driven by a common rotating electrical machine. Moreover, since this vehicle drive device includes the left and right deceleration devices formed by the planetary gear mechanisms, output rotation of the rotating electrical machines is appropriately decelerated and transmitted to the respective output members, and a required driving force is ensured.

In the above vehicle drive device, however, the rotating electrical machines, the deceleration devices, and the output members are provided coaxially. Thus, the positions of the rotating electrical machines are restricted, and the overall size of the device tends to increase in the axial direction. Thus, there are significant restrictions on mounting on vehicles, and dimensional restrictions are also significant when the rotating electrical machines are increased in size in order to improve the driving force. Moreover, since the device has a large overall dimension in the axial direction, an axle connecting the output members and the driving wheels tends to have a short axial length. Thus, a deflection angle of the axle increases due to vertical movement of the driving wheels, thereby imposing a large load on bearings that support the output members connected to the axle. Thus, the bearings are increased in size in order to ensure durability thereof, causing a further increase in overall dimension of the device.

Moreover, since the positions of the rotating electrical machines are restricted to the positions coaxial with the output members, it has been difficult to lower the mounting positions of the rotating electrical machines to lower the center of gravity. Moreover, since the planetary gear mechanisms are used as the deceleration devices, the reduction gear ratio is substantially limited to about 3 to 4, and it has been difficult to obtain a reduction gear ratio larger than about 3 to 4. Thus, it has been difficult to increase the reduction gear ratio to increase the rotational speed of the rotational electrical machines, and thus, it has been difficult to reduce the size of the rotating electrical machines while ensuring a required driving force.

SUMMARY OF THE INVENTION

It is an object of the present invention to provide a vehicle drive device which enables the overall axial dimension of the device to be reduced to improve mountability to vehicles.

A vehicle drive device according to a first aspect of the present invention includes: two independent systems provided for two driving wheels, respectively, where each system includes a rotating electrical machine, an output member to be connected to a corresponding driving wheel, a drive transmission system which connects the rotating electrical machine and the output member so that driving force is transmitted therebetween, and a case integrally accommodating the rotating electrical machines, the output members, and the drive transmission systems of the two systems. In the vehicle drive device according to the first aspect, the rotating electrical machine, the output member, and the counter deceleration mechanism of each system included in the drive transmission system are provided so that their respective rotation axes are parallel to each other, and are positioned so as to overlap each other in the rotation axis direction, and the rotating electrical machine of each system is provided with an output portion located on one side of the rotating electrical machine which is distal from the corresponding driving wheel in the rotation axis direction of the rotating electrical machine.

Note that, in the aspect, the term "rotating electrical machine" is used as a concept including a motor (an electric motor), a generator (an electric generator), and a motor-generator functioning both as a motor and a generator as needed. In the present application, the term "drivingly connect" indicates a state where members are connected so that a driving force can be transmitted therebetween, and includes not only a state where the driving force is directly transmitted between two members, but also a state where the driving force is indirectly transmitted between two members through one or more members.

According to the first aspect, the rotating electrical machine, the output member, and the counter deceleration mechanism included in the drive transmission system of each system are provided so that their respective rotation axes are parallel to each other, and thus, can be positioned so as to overlap each other in the rotation axis direction. This aspect can reduce the overall axial dimension of the device as compared to the case where these components are provided coaxially. Thus, a long distance can be ensured from the output member to the driving wheel. Moreover, according to this aspect, the rotating electrical machine of each system is provided with the output portion located on one side of the rotating electrical machine which is distal from the corresponding driving wheel in the rotation axis direction of the rotating electrical machine. This aspect enables the drive transmission system drivingly connected to the output portion of the rotating electrical machine, and the output member drivingly connected to the drive transmission system to be provided at positions located relatively away from the driving wheel. Thus, a longer distance can be ensured from the output member to the driving wheel. This can improve the mountability to vehicles, and can increase the axial length of an axle connecting the output member and the driving wheel, whereby the durability of bearings supporting the output member can be easily ensured. Moreover, since the rotating electrical machine is provided on a different axis from that of the output member, the degree of freedom in the mounting position of the rotating electrical machine is improved. Thus, the rotation axis of the rotating electrical machine can be positioned lower than that of the output member to lower the center of gravity. Moreover, since the counter deceleration mechanism is included in the drive transmission system, output rotation of the rotating electrical machine can be decelerated and transmitted to the output member at a larger reduction gear ration than that of a planetary gear mechanism. Thus, by increasing the rotational speed of the rotating electrical machine, the size of the rotating electrical machine can further be reduced while ensuring a required driving force.

In the aspect, the rotating electrical machine, the output member, and the drive transmission system of one system, and the rotating electrical machine, the output member, and the drive transmission system of the other system may be arranged in mirror symmetry to each other in the case.

According to this aspect, the output portion of the rotating electrical machine, the drive transmission system drivingly connected to the output portion of the rotating electrical machine, and the output member of each system can be provided close to the center of the entire device, which is located on the side away from the two driving wheels that are commonly arranged in mirror symmetry to each other. This aspect can reduce the overall axial dimension of the device, whereby a long distance can be ensured from the output member to the driving wheel. Moreover, according to this structure, since the rotation axes of the rotating electrical machines, the output members, and the counter deceleration mechanisms of the two systems are arranged in mirror symmetry to each other, a shaft support structure of the case can be simplified.

In the aspect, the counter deceleration mechanism of each system may have a first gear and a second gear which are rotating integrally with each other, the first gear be drivingly connected to the output portion of the rotating electrical machine, and the second gear be provided at a position that is more proximal to the driving wheel than the first gear is in the rotation axis direction of the counter deceleration mechanism, and is drivingly connected to the output member.

According to this structure, the counter deceleration mechanism and the rotating electrical machine of each system can be positioned on the same plane that is perpendicular to the rotation axis of the rotating electrical machine. Moreover, for example, in the case where the rotating electrical machines and the counter deceleration mechanisms of the two systems are arranged in mirror symmetry to each other, the rotating electrical machines, which are generally the largest components in the rotation axis direction, can be provided so that their respective output portions are located farthest from the driving wheels. Thus, the overall axial dimension of the device can be reduced.

the first gear and the second gear may be provided adjacent to each other.

According to this structure, the second gear drivingly connected to the output member is provided adjacent to the first gear drivingly connected to the output portion of the rotating electrical machine. Thus, the output member can be provided at a position closer to the output portion of the rotating electrical machine, that is, at a position located relatively away from the driving wheel. Thus, a long distance can be ensured also from the output member to the driving wheel.

The output portion of the rotating electrical machine of each system may have a rotating electrical machine output gear that rotates integrally with a rotor shaft of the rotating electrical machine, and the drive transmission system of each system have an idler gear for drivingly connecting the rotating electrical machine output gear and the first gear.

According to this structure, the idler gear is provided between the rotating electrical machine output gear and the first gear in each system, whereby the counter deceleration mechanism of each system can be easily positioned radially outside the corresponding rotating electrical machine. Thus, the overall axial dimension of the device can be reduced as compared to the case where the counter deceleration mechanisms are respectively provided adjacent to the rotational electrical machines, which are generally the largest components in the rotation axis direction.

The idler gear of each system may be structured to mesh with the rotating electrical machine output gear and the first gear.

The rotating electrical machine output gear, the idler gear, and the first gear of one system be provided adjacent to the rotating electrical machine output gear, the idler gear, and the first gear of the other system, respectively.

According to this structure, the rotating electrical machine output gears, the idler gears, and the first gears of the two systems can be provided close to the center of the entire device in the axial direction. Thus, the overall axial dimension of the device can be reduced, and a long distance can be ensured from the output member to the driving wheel. Moreover, according to this structure, the same shaft support structures can be respectively used for the rotating electrical machine output gears, the idler gears, and the counter deceleration mechanisms including the first gears, which are provided adjacent to each other. Thus, the structure of the case can also be simplified.

The rotating electrical machine output gear, the idler gear, and the first gear of each system may be arranged in line in a direction perpendicular to respective rotation axes thereof.

According to this structure, the idler gear and the first gear of each system are arranged on the plane which is perpendicular to the rotation axis of the rotating electrical machine output gear, and on which the rotating electrical machine which is located distal from the driving wheel in the rotation axis direction of the rotating electrical machine is present. Thus, the rotating electrical machine output gears, the idler gears, and the first gears of the two systems can be provided close to the center of the entire device in the axial direction. Accordingly, the overall axial dimension of the device can be reduced, and a long distance can also be ensured from the output member to the driving wheel.

The second gear of each system may be structured to mesh with a drive output gear that rotates integrally with the output member.

The output member of each system is supported by the case by a first output bearing and a second output bearing which are provided at different positions in the rotation axis direction of the output member, and the first output bearing may be positioned on a plane which is perpendicular to the rotation axis of the output member, and on which the first gear.

According to the above structure, the first output bearing of each system is positioned on the plane which is perpendicular to the rotation axis of the output member, and on which the first gear of the counter deceleration mechanism, which is drivingly connected to the output portion of the rotating electrical machine, is present, whereby the first output bearing supporting the output member can be provided at a position close to the output portion of the rotating electrical machine in the axial direction, that is, at a position located relatively away from the driving wheel. Thus, the overall axial dimension of the device can be reduced, and a long distance can also be ensured from the output member to the driving wheel.

The second output bearing of each system may be positioned radially inside an outer peripheral surface of a drive output gear provided in the output member so as to be on a plane which is perpendicular to the rotation axis of the output member, and on which the drive output gear is present.

According to this structure, the second output bearing of each system can be positioned so as to overlap the drive output gear in the rotation axis direction, by using a space produced radially inside the drive output gear provided in the output member. Thus, the axial dimension for providing the output members in the case can be reduced. As a result, the overall axial dimension of the device can be reduced, and a long distance can also be ensured from the output member to the driving wheel.

The rotor shaft of the rotating electrical machine of each system may be supported by the case by a rotor bearing, and the rotor bearing be positioned radially inside a stator of the rotating electrical machine so as to be on a plane which is perpendicular to the rotation axis of the rotating electrical machine, and on which a coil end portion of the stator is present.

According to this structure, the rotor bearing of each system for supporting the rotor shaft of the rotating electrical machine is positioned so as to overlap the coil end portion of the stator in the rotation axis direction, whereby the axial dimension for providing the rotating electrical machines in the case can be reduced. Thus, the overall axial dimension of the device can be reduced by reducing the axial dimension for providing the rotating electrical machines, which are generally the largest components in the device.

The counter deceleration mechanisms of the two systems, which are respectively included in the drive transmission systems of the two systems, may be supported on an outer periphery of a common shaft supported by the case, so that the counter deceleration mechanisms are rotatable independently of each other.

According to this structure, the counter deceleration mechanisms can be supported by the common shaft by providing bearings on the inner periphery of each counter deceleration mechanism. Thus, as compared to the structure in which the counter deceleration mechanisms of the two systems are supported by the case by providing bearings at both ends of the respective shafts of the counter deceleration mechanisms, the axial dimension of the support structure of the counter deceleration mechanisms can be reduced. Thus, the overall axial dimension of the device can be reduced.

The idler gears of the two systems, which are respectively included in the drive transmission systems of the two systems, may be supported on an outer periphery of a common shaft supported by the case, so that the idler gears are rotatable independently of each other.

According to this structure, the idler gears can be supported by the common shaft by providing bearings on the inner periphery of each idler gear. Thus, as compared to the structure in which the idler gears of the two systems are supported by the case by bearings provided at both ends of the respective shafts of the idler gears, the axial dimension of the support structure of the idler gears can be reduced. Thus, the overall axial dimension of the device can be reduced.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 1 is an axial cross-sectional view showing the overall structure of a vehicle drive device according to an embodiment of the present invention;

DETAILED DESCRIPTION OF THE EMBODIMENTS

First, a vehicle drive device D according to an embodiment of the present invention will be described with reference to the accompanying drawings. The present embodiment will be described with respect to an example in which the vehicle drive device D is applied to a drive device for electric vehicles (electric cars). As shown in FIGS. 1 through 4, the vehicle drive device D of the present embodiment includes two independent systems for two driving wheels Wl, Wr, and a case DC which integrally accommodates the systems. The systems respectively include motor-generators MGl, MGr as a driving force source of a vehicle, output shafts Ol, Or respectively connected to the driving wheels Wl, Wr, and drive transmission systems Tl, Tr for respectively connecting the motor-generators MGl, MGr and the output shafts Ol, Or to each other so that driving force is transmitted therebetween. Note that, in the present embodiment, the motor-generators MGl, MGr correspond to "rotating electrical machines" in the present invention. Moreover, the output shafts Ol, Or correspond to "output members" in the present invention. The structure of each part of the vehicle drive device D will be described in detail below.

1. Arrangement and Structure of Each Part of the Device

Figure 2:
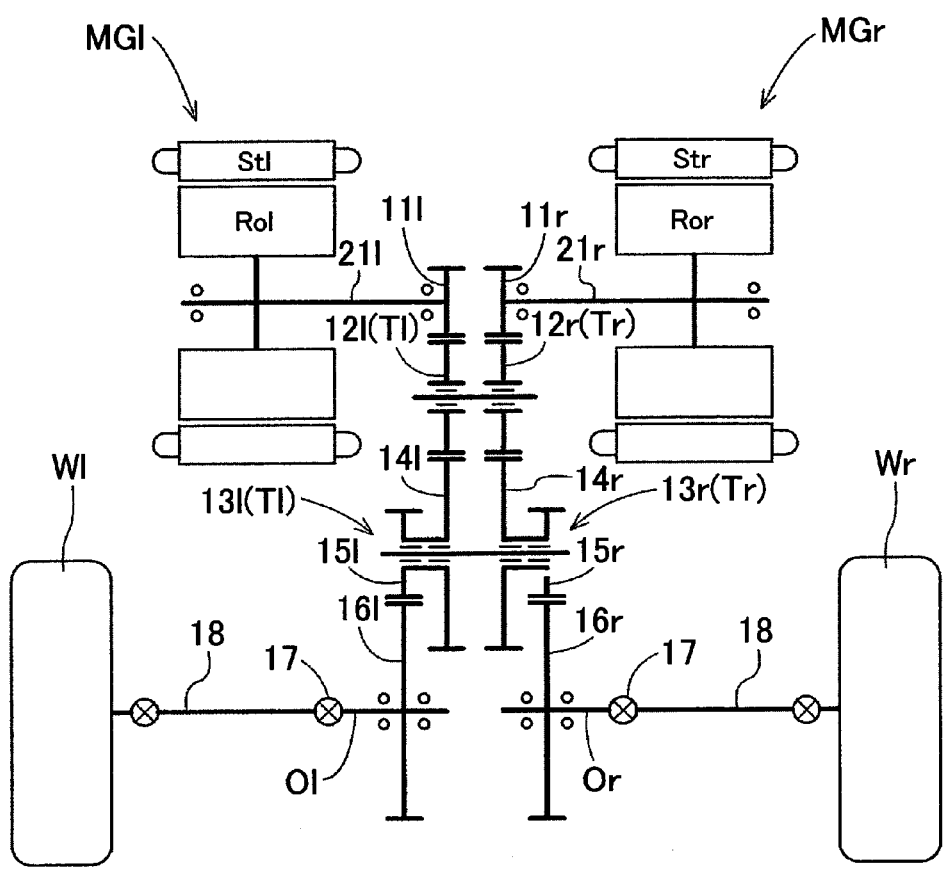
FIG. 2 is a skeleton diagram of the vehicle drive device according to the embodiment of the present invention.

First, the arrangement and structure of each part of the vehicle drive device D will be described. As shown in FIGS. 1 and 2, in the present embodiment, two driving wheels are left and right driving wheels, which serve as front wheels or rear wheels of a vehicle. Moreover, the vehicle drive device D includes left and right motor-generators, left and right drive transmission systems, and left and right output shafts in order to drive the left and right driving wheels Wl, Wr by separate drive systems, respectively. That is, the vehicle drive device D includes, as a left system for driving the left driving wheel Wl, the left output shaft Ol connected to the left driving wheel Wl, the left motor-generator MGl for driving the left driving wheel Wl, and the left drive transmission system Tl for connecting the left motor-generator MGl and the left output shaft Ol to each other so that the driving force is transmitted therebetween. The vehicle drive device D further includes, as a right system for driving the right driving wheel Wr, the right output shaft Or connected to the right driving wheel Wr, the right motor-generator MGr for driving the right driving wheel Wr, and the right drive transmission system Tr for connecting the right motor-generator MGr and the right output shaft Or to each other so that the driving force is transmitted therebetween. The left motor-generator MGl, the left drive transmission system Tl, the left output shaft Ol, and the left driving wheel Wl of the left system are disconnected from the right motor-generator MGr, the right drive transmission system Tr, the right output shaft Or, and the right driving wheel Wr of the right system so that a driving-force is not transmitted from one to another, so that the components of the left system and the components of the right system can rotate independently of each other substantially without being affected by each other's rotation or each other's transmitted driving force.

In the right system, the motor-generator MGr (including an output portion of the motor-generator MGr; the same applies to the following description), the output shaft Or, and a counter deceleration mechanism 13r (which will be described below) included in the drive transmission system Tr are arranged so that their respective rotation axes are parallel to each other, and are positioned so as to overlap each other in the rotation axis direction. Similarly, in the left system, the motor-generator MGl (including an output portion of the motor-generator MGl; the same applies to the following description), the output shaft Ol, and a counter deceleration mechanism 13l (which will be described below) included in the drive transmission system Tl are arranged so that their respective rotation axes are parallel to each other, and are positioned so as to overlap each other in the rotation axis direction. Thus, the motor-generator MGr (or MGl), the output shaft Or (or Ol), and the counter deceleration mechanism 13r (or 13l) are provided on the place which is perpendicular to the rotational axis of the motor-generator. An idler gear 12r included in the drive transmission system Tr of the right system is also arranged so that its rotation axis is parallel to the respective rotation axes of the motor-generator MGr and the counter deceleration mechanism 13r, and is positioned so as to overlap the motor-generator MGr and the counter deceleration mechanism 13r in the rotation axis direction. Similarly, in the left system, an idler gear 12l included in the left drive transmission system Tl is also arranged so that its rotation axis is parallel to the respective rotation axes of the motor-generator MGl and the counter deceleration mechanism 13l, and is positioned so as to overlap the motor-generator MGl and the counter deceleration mechanism 13l in the rotation axis direction. Moreover, in the present embodiment, the idler gear 12r and the counter deceleration mechanism 13r, which are included in the drive transmission system Tr in the right system, are arranged so as to fit in the axial length of the motor-generator MGr in the rotation axis direction. Similarly, the idler gear 12l and the counter deceleration mechanism 13l, which are included in the drive transmission system Tl in the left system, are arranged so as to fit in the axial length of the motor-generator MGl in the rotation axis direction. This structure reduces the overall dimension of the vehicle drive device D in the rotation axis direction. As shown also in FIG. 2, in the present embodiment, the rotation axis direction, that is, the direction parallel to the respective rotation axes, arranged parallel to each other, of the motor-generators MGl, MGr, the output shafts Ol, Or, and the idler gears 12l, 12r and the counter deceleration mechanisms 13l, 13r which are respectively included in the drive transmission systems Tl, Tr matches the width direction of the vehicle (the direction connecting the left and right driving wheels Wl, Wr), and this direction is the width direction of the vehicle drive device D. In the following description, the rotation axis direction, and the width direction of the vehicle drive device D are simply referred to as the "device width direction."

Moreover, in the vehicle drive device D of the present embodiment, the pair of left and right motor-generators MGl, MGr, the pair of left and right drive transmission systems Tl, Tr, and the pair of left and right output shafts Ol, Or are arranged so as to face each other in the device width direction. Thus, the left motor-generator MGl, the left drive transmission system Tl, and the left output shaft Ol of the left system corresponding to the left driving wheel Wl, and the right motor-generator MGr, the right drive transmission system Tr, and the right output shaft Or of the right system corresponding to the right driving wheel Wr are arranged in mirror symmetry to each other in the case DC with respect to a central plane in the device width direction.

The motor-generator MGr included in the right system has a stator Str fixed to the case DC, and a rotor Ror rotatably supported radially inside the stator Str. The motor-generator MGl included in the left system also has a stator Stl fixed to the case DC, and a rotor Rol rotatably supported radially inside the stator Stl. The motor-generators MGl, MGr are respectively electrically connected to electricity accumulating devices, such as batteries and capacitors, through inverters which are not shown. The motor-generators MGl, MGr are capable of functioning as a motor (an electric motor) for receiving supply of electric power and generating a driving force, and a generator (an electric generator) for generating electric power by a driving force transmitted from the respective driving wheels Wl, Wr. In this example, the motor-generators MGl, MGr function as a motor to mainly generate a driving force to drive the left and right driving wheels Wl, Wr, thereby causing the vehicle to travel. That is, the motor-generators MGl, MGr function as a driving force source of the vehicle. During deceleration of the vehicle, the motor-generators MGl, MGr can function as a generator to regenerate an inertia force of the vehicle as electric energy.

The left and right motor-generators MGl, MGr are arranged coaxially so as to face each other. The right motor-generator MGr includes, as its output portion, a motor-generator output gear (hereinafter referred to as the "MG output gear") 11r that rotates integrally with a rotor shaft 21r, which is a shaft of the rotor Ror. The left motor-generator MGl includes, as its output portion, a motor-generator output gear (hereinafter referred to as the "MG output gear") 11l that rotates integrally with a rotor shaft 21l, which is a shaft of the rotor Rol. The pair of MG output gears 11r, 11l are provided on the opposite side to the driving wheels of the respective systems in the rotation axis direction of the motor-generators, that is, on the central side in the device width direction. In the other words, the pair of MG output gears 11r, 11l are located on one side of the rotational electrical machine which is distal form the corresponding driving wheels of the respective systems in the rotational axis direction of the motor-generators. More specifically, the left MG output gear 11l is provided on the opposite side (on the right side in the figure) of the left motor-generator MGl to the left driving wheel Wl in the axial direction, and the right MG output gear 11r is provided on the opposite side (on the left side in the figure) of the right motor-generator MGr to the right driving wheel Wr in the axial direction. Thus, the MG output gears 11r, 11l are integrally formed at the ends of the rotor shafts 21r, 21r of the motor-generators MGl, MGr, which are located on the central side in the device width direction. Thus, the left and right MG output gears 11l, 11r are provided adjacent to each other in an intermediate portion between the left and right motor generators MGl, MGr in the axial direction, that is, in a central portion in the device width direction. In the present embodiment, the MG output gears 11r, 11l correspond to rotating electrical machine output gears in the present invention, and functions as output portions of rotating electrical machines, respectively.

Figure 3:
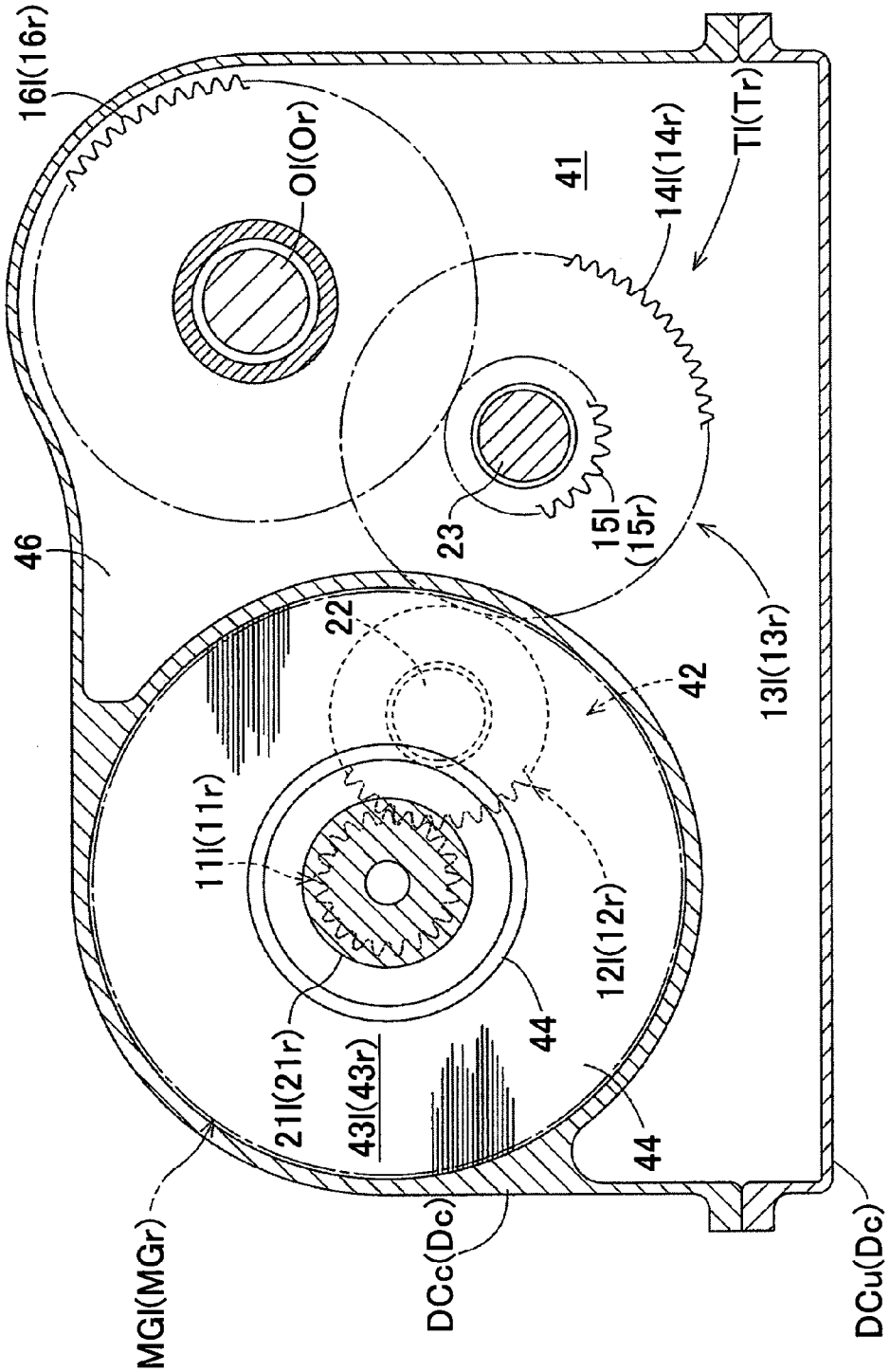
FIG. 3 is a cross-sectional view taken along line III-III in FIG. 1.

Moreover, as shown in FIG. 3, the rotation axis (the rotor shaft 21r) of the motor-generator MGr is positioned lower than the output shaft Or in the vertical direction. The rotation axis (the rotor shaft 21l) of the motor-generator MGl is also positioned lower than the output shaft Ol in the vertical direction. That is, in the vehicle drive device D, the heavy motor-generators MGl, MGr are mounted on the vehicle to be lower than the output shafts Ol, Or, respectively. This structure lowers the center of gravity as compared to the case where the motor-generators MGl, MGr are provided coaxially with the output shafts Ol, Or as in conventional examples.

The right drive transmission system Tr is a mechanism for connecting the motor-generator MGr and the output shaft Or of the right system so that the driving force is transmitted therebetween. The left drive transmission system Tl is a mechanism for connecting the motor-generator MGl and the output shaft Ol of the left system so that the driving force is transmitted therebetween. The right drive transmission system Tr is structured to be independently from that the right system Tr. The right drive transmission system Tr is herein formed by a gear train that drivingly connects from, the MG output gear 11r to a drive output gear 16r of the right system. The left drive transmission system Tl is formed by a gear train that drivingly connects from the MG output gear 11l to the drive output gear 16l of the left system. More specifically, as shown in FIGS. 1 and 2, the drive transmission system Tr of the right system has the idler gear 12r and the counter deceleration mechanism 13r. That is, in this drive transmission system Tr, a rotation driving force transmitted from the motor-generator MGr to the MG output gear 11r is transmitted to the counter deceleration mechanism 13r through the idler gear 12r, and a rotational speed of the motor-generator MGr is decelerated by the counter deceleration mechanism 13r and transmitted to the drive output gear 16r. Then, the rotation driving force transmitted to the drive output gear 16r is transmitted to the driving wheel Wr through the output shaft Or that rotates integrally with the drive output gear 16r. The drive transmission system Tl of the left system has the idler gear 12l and the counter deceleration mechanism 13l. That is, in this drive transmission system Tl, a rotation driving force transmitted from the motor-generator MGl to the MG output gear 11l is transmitted to the counter deceleration mechanism 13l through the idler gear 12l, and a rotational speed of the motor-generator MGl is decelerated by the counter deceleration mechanism 13l and transmitted to the drive output gear 16l. Then, the rotation driving force transmitted to the drive output gear 16l is transmitted to the driving wheel Wl through the output shaft Ol that rotates integrally with the drive output gear 16l.

The left idler gear 12l meshes with the left MG output gear 11l on the upstream side (on the left motor-generator MGl side; the same applies to the following description) of the left drive transmission system Tl, and meshes with a left first gear 14l of the left counter deceleration mechanism 13l on the downstream side of the left drive transmission system Tl. The left idler gear 12l is provided so as to connect the left MG output gear 11l and the left first gear 14l to each other so that the driving force is transmitted therebetween. Similarly, the right idler gear 12r meshes with the right MG output gear 11r on the upstream side (on the right motor-generator MGr side; the same applies to the following description) of the right drive transmission system Tr, and meshes with a right first gear 14r of the right counter deceleration mechanism 13r on the downstream side of the right drive transmission system. The right idler gear 12r is provided so as to connect the right MG output gear 11r and the right first gear 14r to each other so that the driving force is transmitted therebetween.

In order to implement such meshing, the left idler gear 12l is provided at the same position as that of the left MG output gear 11l in the device width direction, and the right idler gear 12r is provided at the same position as that of the right MG output gear 11r in the device width direction. Thus, the right idler gear 12r is provided in the central portion in the device width direction, which is located at the side of the motor-generator MGr of the right system which is distal from the driving wheel Wr, and the left idler gear 12l is provided in the central portion in the device width direction, which is located at the side of the motor-generator MGl of the left system which is distal from the driving wheel Wl. That is, the left and right idler gears 12l, 12r are provided adjacent to each other in an intermediate portion between the left and right motor-generators MGl, MGr in the axial direction. Moreover, as specifically shown in FIG. 3, the right idler gear 12r is positioned so as to radially outside of the right motor-generator MGr, and at a position that overlaps the right motor-generator MGr when viewed in an axial direction of the right motor-generator MGr. Similarly, the left idler gear 12l is positioned so as to radially outside of the left motor-generator MGl, and at a position that overlaps the left motor-generator MGl when viewed in an axial direction of the left motor-generator MGl. That is, the left and right idler gears 12l, 12r are provided in a space between the left and right motor generators MGl, MGr in the axial direction, and is radially inside the outer peripheral surfaces of the stators Stl, Str. In other words, the left and right idler gears 12l, 12r are provided in a cylindrical space located between the stator Stl and the rotor Rol of the left motor-generator MGl, and the stator Str and the rotor Ror of the right motor-generator MGr. In this vehicle drive device D, the left and right idler gears 12l, 12r are provided in this manner, whereby the counter deceleration mechanisms 13l, 13r are provided radially outside the motor-generators MGl, MGr, respectively. This structure reduces the overall dimension of the vehicle drive device D in the axial direction (the device width direction).

Moreover, as shown in FIG. 1, the left idler gear 12l and the right idler gear 12r are supported on the outer periphery of an idler support shaft 22, which is a common shaft supported by the case DC, so as to be rotatable independently of each other. This structure for supporting the idler gears 12l, 12r will be described later in detail.

The counter deceleration mechanism 13r is a mechanism for decelerating output rotation of the motor-generator MGr to transmit the decelerated rotation to the output shaft Or in the right system. Similarly, the counter deceleration mechanism 13l is a mechanism for decelerating output rotation of the motor-generator MGl to transmit the decelerated rotation to the output shaft Ol in the left system. Thus, each of the left and right counter deceleration mechanisms 13l, 13r is a gear mechanism that connects the idler gear and the drive output gear of the same system to each other so that the driving force is transmitted therebetween, and decelerates rotation of the idler gear to transmit the decelerated rotation to the drive output gear. The counter deceleration mechanism 13r has the first gear 14r and a second gear 15r which rotate integrally with each other. Similarly, the counter deceleration mechanism 13l has the first gear 14l and a second gear 15l which rotate integrally with each other. The left first gear 14l meshes with the left idler gear 12l, and thus, is drivingly connected to the left MG output gear 11l through the left idler gear 12l. The left second gear 15l meshes with the left drive output gear 16l, and thus, is drivingly connected to the left output shaft Ol through the left drive output gear 16l. Similarly, the right first gear 14r meshes with the right idler gear 12r, and thus, is drivingly connected to the right MG output gear 11r through the right idler gear 12r. The right second gear 15r meshes with the right drive output gear 16r, and thus, is drivingly connected to the right output shaft Or through the right drive output gear 16r.

In the left and right counter deceleration mechanisms 13l, 13r, the second gears 15l, 15r are set to have a smaller diameter and a smaller number of teeth than the first gears 14l, 14r. Thus, rotation of the first gears 14l, 14r is decelerated, and transmitted to the second gears 15l, 15r, respectively. Moreover, in this embodiment, the MG output gears 11*l*, 11*r* are set to have a smaller diameter and a smaller number of teeth than the first gears 14*l*, 14*r*. Thus, rotation is decelerated also when transmitted from the MG output gears 11*l*, 11*r* to the first gears 14*l*, 14*r* through the idler gears 12*l*, 12*r*, respectively. Similarly, the second gears 15*l*, 15*r* are set to have a smaller diameter and a smaller number of teeth than the drive output gears 16*l*, 16*r*. Thus, rotation is decelerated also when transmitted from the second gears 15*l*, 15*r* to the drive output gears 16*l*, 16*r*, respectively. The vehicle drive device D is thus structured so that, in each of the left and right systems, rotation of the MG output gear 11*l*, 11*r* is decelerated three times before transmitted to the output shaft Ol, Or. Thus, a reduction gear ration, which is significantly larger than that of a conventional deceleration mechanism using a planetary gear mechanism, can be obtained.

In order to implement the above meshing, the left first gear 14*l* is provided at the same position as that of the left MG output gear 11*l* and the left idler gear 12*l* in the device width direction, and the right first gear 14*r* is provided at the same position as that of the right MG output gear 11*r* and the right idler gear 12*r* in the device width direction. Thus, the right first gear 14*r* is provided in the central portion in the device width direction, which is located on one end side of the output shaft Or which is distal from the end of the output shaft Or to be connected to the driving wheel Wr, in the axial length of the motor-generator MGr of the right system. Similarly, the left first gear 14*l* is provided in the central portion in the device width direction, which is located on one end side of the output shaft Ol located which distal from the driving wheel Wl, in the axial length of the motor-generator MGl of the left system. Thus, the right first gear 14*r* and the left first gear 14*l* are provided adjacent to each other in the device width direction. Moreover, in the right counter deceleration mechanism 13*r*, the first gear 14*r* and the second gear 15*r* are provided adjacent to each other. Similarly, in the left counter deceleration mechanism 13*l*, the first gear 14*l* and the second gear 15*l* are provided adjacent to each other. The left second gear 15*l* is provided at a position that is more proximal to the end of the output shaft Ol to be connected to the left driving wheel Wl, than the left first gear 14*l* is in the device width direction (the rotation axis direction of the counter deceleration mechanisms 13*l*, 13*r*). The right second gear 15*r* is provided at a position that is more proximal to the end of the output shaft Or to be connected to the right driving wheel Wr, than the right first gear 14*r* is in the device width direction.

Moreover, as shown in FIG. 1, the left counter deceleration mechanism 13*l* and the right counter deceleration mechanism 13*r* are supported on the outer periphery of a counter support shaft 23, which is a common shaft supported by the case DC, so as to be rotatable independently of each other. This support structure of the counter deceleration mechanisms 13*l*, 13*r* will be described later in detail;

As described above, the left MG output gear 11*l*, the left idler gear 12*l*, and the left first gear 14*l* of the left system are provided at the same position in the device width direction, and thus, are arranged on the plane that is perpendicular to their respective rotation axes. That is, the left idler gear 12*l* is provided radially outside of the MG output gear 11*l* and between the MG output gear 11*l* and the left first gear 14*l*. Similarly, the right MG output gear 11*r*, the right idler gear 12*r*, and the right first gear 14*r* of the right system are provided at the same position in the device width direction, and thus, are arranged on the place that is perpendicular to their respective rotation axes. That is, the right idler gear 12*r* is provided between the MG output gear 11*r* and the right first gear 14*r*. In the central portion in the device width direction, the left MG output gear 11*l*, the left idler gear 12*l*, and the left first gear 14*l* of the left system are provided adjacent to the right MG output gear 11*r*, the right idler gear 12*r*, and the right first gear 14*r* of the right system, respectively. Thus, left and right driving-force transmission systems are arranged side by side in two lines on the central side in the device width direction, whereby the dimension of the vehicle drive device D in the width direction can be reduced.

The right output shaft Or is a shaft for outputting a rotation driving force from the vehicle drive device D to the driving wheel Wr, and is connected to the driving wheel Wr. Similarly, the left output shaft Ol is a shaft for outputting a rotation driving force from the vehicle drive device D to the driving wheel Wl, and is connected to the driving wheel Wl. In the present embodiment, as shown in FIGS. 1 and 2, the right output shaft Or is connected to the right driving wheel Wr through a constant velocity joint 17 and a drive shaft 18 so as to rotate integrally with the right driving wheel Wr. Moreover, the drive output gear 16*r* is connected to the distal end of the output shaft Or, which is located away from the side of the output shaft Or to be connected to the driving wheel Wr, so that the drive output gear 16*r* rotates integrally with the output shaft Or. Similarly, the left output shaft Ol is connected to the left driving wheel Wl through a constant velocity joint 17 and a drive shaft 18 so as to rotate integrally with the left driving wheel Wl. Moreover, the drive output gear 16*l* is connected to the distal end of the output shaft Ol, which is located away from the side of the output shaft Ol to be connected to the driving wheel Wl, so that the drive output gear 16*l* rotates integrally with the output shaft Ol. The drive output gear 16*r* is herein fitted onto the end of the output shaft Or, which is distal from the driving wheel Wr, and is fixed by spline engagement with the outer peripheral surface of the end of the output shaft Or so as to rotate integrally with the output shaft Or. Similarly, the drive output gear 16*l* is fitted onto the end of the output shaft Ol, which is distal from the driving wheel Wl, and is fixed by spline engagement with the outer peripheral surface of the end of the output shaft Ol so as to rotate integrally with the output shaft Or. As described above, the right drive output gear 16*r* is provided so as to mesh with the second gear 15*r* of the right counter deceleration mechanism 13*r*. Similarly, the left drive output gear 16*l* is provided so as to mesh with the second gear 15*l* of the left counter deceleration mechanism 13*l*. In order to implement such meshing, the left drive output gear 16*l* is provided at the same position as that of the left second gear 15*l* in the device width direction, and the right drive output gear 16*r* is provided at the same position as that of the right second gear 15*r* in the device width direction. Thus, the left and right drive output gears 16*l*, 16*r* are provided in the central portion of the vehicle drive device D in the width direction, whereby the output shafts Ol, Or are also provided at positions closer to the central of the vehicle drive device D in the width direction. This structure can reduce the dimension of the vehicle drive device D in the width direction, and can ensure a long distance from the output shafts Ol, Or to the driving wheels Wl, Wr.

The case DC is a member that integrally accommodates the components of the vehicle drive device D. The motor-generators MGl, MGr, the drive transmission systems Tl, Tr, and the output shafts Ol, Or of the left and right systems described above are also integrally accommodated in the case DC. As described above, the components accommodated in the case DC are arranged in mirror symmetry with respect to the central plane in the device width direction. Thus, the case DC is formed so as to have a mirror-symmetrical shape with respect to the central plane in the device width direction. This enables the support structure of each shaft provided in the case DC to have a laterally symmetrical shape, whereby the structure of the case DC can be simplified.

In the present embodiment, as shown in FIGS. 1 and 3, the case DC has a main case DCc, a left cover DCl, a right cover DCr, and a lower cover DCu. As shown in FIG. 1, the main case DCc is a main part of the case DC which accommodates the components of the vehicle drive device D. The main case DCc has a left motor-generator accommodating chamber (hereinafter referred to as the "left MG accommodating chamber") 43l which accommodates the left motor-generator MGl, a right motor-generator accommodating chamber (hereinafter referred to as the "right MG accommodating chamber") 43r which accommodates the right motor-generator MGr, and a first gear mechanism accommodating chamber 41 and a second gear mechanism accommodating chamber 42 which accommodate the left and right drive transmission systems Tl, Tr in common. The left cover DCl is a cover that is attached to the main case DCc so as to cover an opening of the left MG accommodating chamber 43l, which is located on the side (the left side in FIG. 1) proximal to the end of the output shaft Ol to be connected to the left driving wheel Wl. The right cover DCr is a cover that is attached to the main case DCc so as to cover an opening of the right MG accommodating chamber 43r, which is located on the side (the right side in FIG. 1) proximal to the end of the output shaft Or to be connected to the right driving wheel Wr. As shown in FIG. 3, the lower cover DCu is a cover that is attached to the main case DCc so as to cover a lower opening of the main case DCc.

As shown in FIGS. 1 and 3, the case DC is formed so that a portion of the case DC, which surrounds the left and right MG accommodating chambers 43l, 43r provided so as to face each other, has a cylindrical shape that is coaxial with the rotation shafts of the motor generators MGl, MGr, and so that a portion of the case DC, which extends under the cylindrical portion, and a portion of the case DC, which extends from the cylindrical portion toward the output shafts Ol, Or, have a substantially rectangular parallelepiped shape. The portion of the case DC, which extends from the cylindrical portion toward the output shafts Ol, Or, is formed so as to surround the first gear mechanism accommodating chamber 41. The portion of the case DC, which extends under the cylindrical portion, mainly forms a space inside the case DC in order to collect and store an oil for lubricating and cooling the motor-generators MGl, MGr and the drive transmission systems Tl, Tr.

As shown in FIG. 1, the left MG accommodating chamber 43l and the right MG accommodating chamber 43r in the case DC are separated from each other by an intermediate support wall 44. This intermediate support wall 44 is divided into two parts, that is, left and right parts, on the output shaft Ol, Or side from support portions of the rotor shafts 21l, 21r, respectively. The second gear accommodating chamber 42 is provided inside the intermediate support wall 44, that is, between the left and right intermediate support walls 44. The MG output gears 11l, 11r and the idler gears 12l, 12r of the left and right systems are accommodated in common in the second gear mechanism accommodating chamber 42. Thus, the intermediate support wall 44 supports the portions of the left and right rotor shafts 21l, 21r which are proximal to the center of the vehicle drive device in the device width direction, and both ends of the idler support shaft 22 that supports the left and right idler gears 12l, 12r in common.

Moreover, the first gear mechanism accommodating chamber 41 is formed at the position that is more proximal to the output shaft Ol, Or than the second gear mechanism accommodating chamber 42 is, in the case DC, so as to form a common space that is continuous with the second gear mechanism accommodating chamber 42. The counter deceleration mechanisms 13l, 13r and the drive output gears 16l, 16r of the left and right systems are accommodated in common in the first gear mechanism accommodating chamber 41. Thus, both ends of the counter support shaft 23, which supports the left and right counter deceleration mechanisms 13l, 13r in common, are supported by left and right sidewalls 45 of the case DC which surround the second gear mechanism accommodating chamber 42, and the left and right output shafts Ol, Or and the drive output gears 16l, 16r that are respectively fitted thereon are also supported by the left and right sidewalls 45. Note that a central support portion 46 for supporting the ends of the left and right output shafts Ol, Or and the ends of the left and right drive output gears 16l, 16r, which are proximal to the center of the vehicle drive device in the device width direction is provided in the first gear mechanism accommodating chamber 41. In the present embodiment, the first gear mechanism accommodating chamber 41 corresponds to a common accommodating chamber in the present invention, and the second gear mechanism accommodating chamber 42 corresponds to a second common accommodating chamber in the present invention. Note that the shaft support structure for supporting each part of the vehicle drive device D will be described in detail below.

2. Shaft Support Structure of Each Part of the Vehicle Drive Device D

Figure 4:
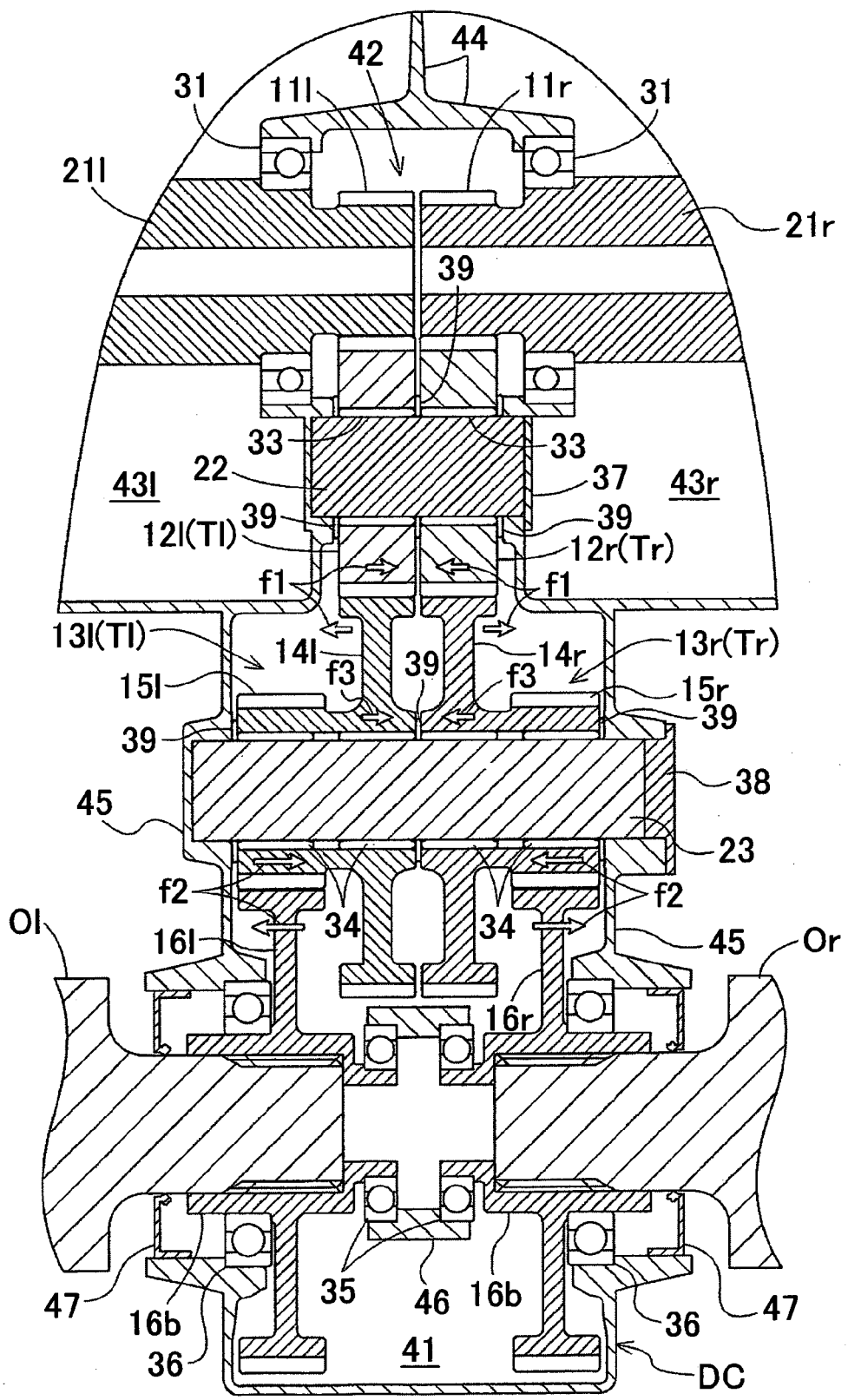
FIG. 4 is a partial enlarged view showing the structure of a drive transmission system of the vehicle drive device according to the embodiment of the present invention.

Next, the shaft support structure of each part of the vehicle drive device D will be described. As shown in FIGS. 1 and 4, in the present embodiment, the left rotor shaft 21l of the left motor-generator MGl and the right rotor shaft 21r of the right rotor-generator MGr, and the left output shaft Ol and the right output shaft Or have an outer-diameter support structure in which each shaft is rotatably supported by the case DC through a corresponding bearing provided on the outer periphery of the shaft. On the other hand, the right idler gear 12r and the right counter deceleration mechanism 13r of the right drive transmission system Tr, and the left idler gear 12l and the left counter deceleration mechanism 13l of the left drive transmission system Tl have an inner-diameter support structure in which each gear mechanism is supported rotatably relative to a corresponding shaft fixedly supported by the case DC, through a corresponding bearing provided on the inner periphery of each gear mechanism. The support structure of each shaft will be described below.

The rotor shafts 21l, 21r of the left and right motor-generators MGl, MGr are supported at their ends by the case DC through rotor bearings 31, 32. In the present embodiment, the end of the right rotor shaft 21r, which is axially distal from the driving wheel Wr, that is, the end of the right rotor shaft 21r which is proximal to the center of the vehicle drive device in the device width direction, is rotatably supported by the case DC through the central-side rotor bearing 31. The end of the right rotor shaft 21r, which is axially proximal to the right driving wheel Wr, that is, the end of the right rotor shaft 21r which is distal from the center of the vehicle drive device in the device width direction, is rotatably supported by the case DC through the end-side rotor bearing 32. Similarly, the end of the left rotor shaft 21l, which is distal from the driving wheel Wl, that is, the end of the left rotor shaft 21l, which is proximal to the center of the vehicle drive device in the device width direction, is rotatably supported by the case DC through the central-side rotor bearing 31. The end of the left rotor shaft 21l, which is proximal to the left driving wheel Wl in the axial direction, that is, the end of the left rotor shaft 21l, which is distal from the center of the vehicle drive device in the device width direction, is rotatably supported by the case DC through the end-side rotor bearing 32. Ball bearings are herein used as the rotor bearings 31, 32.

The left and right central-side rotor bearings 31 are supported by the intermediate support wall 44 that separates the left MG accommodating chamber 43*l* and the right MG accommodating chamber 43*r* from each other. More specifically, the left and right central-side rotor bearings 31 are respectively supported by the left and right intermediate support walls 44 into which the intermediate support wall is divided to support the rotor shafts 21*l*, 21*r* respectively. That is, the left central-side rotor bearing 31 for, supporting the left rotor shaft 21*l* is supported by being fitted in a boss portion formed in the left intermediate support wall 44, and the right central-side rotor bearing 31 for supporting the right rotor shaft 21*r* is supported by being fitted in a boss portion formed in the right intermediate support wall 44. The second gear mechanism accommodating chamber 42 is formed between the left and right intermediate support walls 44 respectively supporting the left and right central-side rotor bearings 31. The central-side ends of the left and right rotor shafts 21*l*, 21*r* in the device width direction are respectively provided so as to extend through the inner peripheral surfaces of the left and right central-side rotor bearings 31 and protrude into the second gear mechanism accommodating chamber 42. The MG output gears 11*l*, 11*r* are respectively formed on these central-side ends of the left and right rotor shafts 21*l*, 21*r*. Thus, the MG output gears 11*l*, 11*r* are provided between the left and right intermediate support walls 44.

The left and right end-side rotor bearings 32 are respectively supported by the covers DCl, DCr that respectively cover the openings of the MG accommodating chambers 43*l*, 43*r*. More specifically, the left end-side rotor bearing 32 is supported by being fitted in a boss portion formed in a radial central portion of the inner surface of the left cover DCl, and the right end-side rotor bearing 32 is supported by being fitted in a boss portion formed in a radial central portion of the inner surface of the right cover DCr. The respective end-side ends of the left and right rotor shafts 21*l*, 21*r* in the device width direction are rotatably supported by the case DC through the left and right end-side rotor bearings 32, respectively. Thus, the rotors Rol, Ror of the motor-generators MGl, MGr have an outer-diameter support structure in which the outer peripheral surfaces of the rotor shafts 21*l*, 21*r* are rotatably supported by the case DC through the rotor bearings 31, 32.

Moreover, the rotor bearings 31, 32 are positioned radially inside the stators Stl, Str of the motor-generators MGl, MGr so as to overlap coil end portions Ce of the stators Stl, Str in the rotation axis direction of the motor-generators MGl, MGr (the device width direction). That is, the central-side rotor bearings 31 and the end-side rotor bearings 32 are positioned radially inside the coil end portions Ce of the stators Stl, Str so as to overlap the coil end portions Ce in the device width direction. The "coil end portion Ce" herein indicates a portion of a coil of each stator Stl, Str of each motor-generator MGl, MGr, which protrudes from the stator core in the axial direction (the device width direction). Moreover, the term "overlap" means that at least a part of each rotor bearing 31, 32 overlaps the corresponding coil end portion Ce in the axial direction (the device width direction). Providing the rotor bearings 31, 32 in this manner can reduce the axial dimension of the case DC for providing the rotor shafts 21*l*, 21*r* of the motor-generators MGl, MGr. In the present embodiment, the portion where the motor-generators MGl, MGr are provided is the largest portion in the vehicle drive device D in the device width direction. Thus, the above structure can reduce the overall dimension of the vehicle drive device D in the axial direction (the device width direction).

Each of the left and right output shafts Ol, Or is supported by the case DC through a central-side output bearing 35 and an end-side output bearing 36 which are provided at different positions in the rotation axis direction of the output shafts Ol, Or (the device width direction). In the present embodiment, a cylindrical hub portion 16*b* of the drive output gear 16*l*, which is fitted onto the central-side end of the output shaft Ol in the device width direction so as to rotate integrally with the output shaft Ol, is rotatably supported by the case DC through the central-side output bearing 35 and the end-side output bearing 36. A cylindrical hub portion 16*b* of the drive output gear 16*r*, which is fitted onto the central-side end of the output shaft Or in the device width direction so as to rotate integrally with the output shaft Or, is rotatably supported by the case DC through the central-side output bearing 35 and the end-side output bearing 36. The output shafts Ol, Or are supported by the case CD in this manner. The left and right output shafts Ol, Or, and the drive output gears 16*l*, 16*r* which rotate integrally with the output shafts Ol, Or, are rotatably supported by the case DC through the output bearings 35, 36 at two positions, that is, at central-side and end-side positions in the device width direction. Ball bearings are herein used as the output bearings 35, 36. In the present embodiment, each central-side output bearing 35 corresponds to a first output bearing in the present invention, and each end-side output bearing 36 corresponds to a second output bearing in the present invention.

The left central-side output bearing 35 is positioned so as to overlap the left first gear 14*l* in the device width direction (i.e., the rotation axis direction of the output shafts Ol, Or), and the right central-side output bearing 35 is positioned so as to overlap the right first gear 14*r* in the device width direction. As described above, since the left and right first gears 14*l*, 14*r* are positioned adjacent to each other in the central portion of the vehicle drive device D in the device width direction, the left and right central-side output bearings 35 are also positioned adjacent to each other in the central portion in the device width direction. In the present embodiment, the left and right central-side output bearings 35 are supported by being respectively fitted into both sides of the central support portion 46 that is provided in a central portion of the first gear mechanism accommodating chamber 41 in the device width direction. The central-side output bearings 35 thus respectively support the smaller-diameter central-side ends of the hub portions 16*b* of the drive output gears 16*l*, 16*r* in the device width direction, whereby the output shafts Ol, Or are rotatably supported by the central support portion 46 of the case DC at the ends of the output shafts Ol, Or which are proximal to the center of the vehicle drive device D in the device width direction, respectively.

The left and right end-side output bearings 36 are positioned radially inside the drive output gears 16*l*, 16*r* so as to overlap the left and right drive output gears 16*l*, 16*r* in the rotation axis direction of the output shafts Ol, Or (the device width direction), respectively. That is, the left and right end-side output bearings 36 are set to have a smaller diameter than the outer diameter of the drive output gears 16*l*, 16*r*. The left end-side output bearing 36 is positioned so as to overlap the left drive output gear 16*l* in the device width direction, and the right end-side output bearing 36 is positioned so as to overlap the right drive output gear 16*r* in the device width direction. Each of the drive output gears 16*l*, 16*r* has a web portion extending radially outward from the hub portion 16*b*, and a rim portion expanded in the device width direction with respect to the web portion in order to ensure the face width, and having teeth formed on its outer peripheral surface. The left end-side output bearing 36 is positioned adjacent to the driving wheel Wl side (the end side in the device width direction) of the web portion of the drive output gear 16*l*, and is also positioned radially inside the rim portion of the drive output gear 16*l*, which is extended in the device width direction from the web portion, so as to overlap the rim portion in the device width direction. The right end-side output bearing 36 is positioned adjacent to the driving wheel Wr side (the end side in the device width direction) of the web portion of the drive output gear 16*r*, and is also positioned radially inside the rim portion of the drive output gear 16*r*, which is extended in the device width direction from the web portion, so as to overlap the rim portion in the device width direction. Thus, in the present embodiment, the left and right end-side output bearings 36 are supported by being respectively fitted in boss portions that are extended from the sidewalls 45 of the case DC toward the inside of the first gear mechanism accommodating chamber 41 (toward the center in the device width direction). The end-side output bearings 36 respectively support a portion of the hub portions 16*b* of the drive output gears 16*l*, 16*r* which is more proximal to the driving wheel Wl, Wr than the web portion is (i.e., the portion of the hub portions 16*b* which is distal from the center of the vehicle drive device in the device width direction), whereby the output shafts Ol, Or are rotatably supported by the sidewalls 45 of the case DC at the positions located on the end side of the vehicle drive device in the device width direction. Note that oil seals 47 are respectively provided radially inside of the boss portions extended from the sidewalls 45 of the case DC toward the driving wheels Wl, Wr (toward the ends in the device width direction). The oil seals 47 prevent the oil inside the case DC from leaking from the boss portions of the case DC for supporting the output shafts Ol, Or to the outside.

As described above, the output shafts Ol, Or have an outer-diameter support structure in which the outer peripheral surfaces of the output shafts Ol, Or are rotatably supported by the case DC through the output bearings 35, 36. Since the central-side output bearings 35 are respectively positioned so as to overlap the first gears 14*l*, 14*r* in the device width direction, the output shafts Ol, Or can be supported at the positions which are distal from the driving wheels Wl, Wr, and the dimension of the support portions for the output shafts Ol, Or in the device width direction can be reduced. Moreover, since the end-side output bearings 36 are respectively positioned radially inside the outer peripheries of the drive output gears 16*l*, 16*r* so as to overlap the drive output gears 16*l*, 16*r* in the device width direction, the end-side output bearings 36 can be provided by effectively using the spaces radially inside the outer peripheral surface of the drive output gears 16*l*, 16*r*, whereby the dimension of the support portions for the output shafts Ol, Or in the device width direction can be reduced. Thus, since the dimension of the support portions for the output shafts Ol, Or in the device width dimension can be reduced, and the ends of the output shafts Ol, Or in the device width direction, which are located closer to the center of the vehicle drive device are respectively supported at the positions away from the driving wheels Wl, Wr, a long distance can be ensured from the output shafts Ol, Or to the driving wheels Wl, Wr.

The left and right idler gears 12*l*, 12*r* are supported on the outer periphery of the idler support shaft 22, which is supported by the case DC and is common to the left and right systems, so that the idler gears 12*l*, 12*r* are rotatable independently of each other. In this case, the left and right idler gears 12*l*, 12*r* are supported by the idler support shaft 22 through respective idler inner peripheral bearings 33, which are respectively provided on the inner peripheries of the idler gears 12*l*, 12*r*, so that the idler gears 12*l*, 12*r* are rotatable independently of each other. The idler support shaft 22 is fixedly supported by the case DC so that the idler support shaft 22 does not rotate. More specifically, both ends of the idler support shaft 22 are supported by the left and right intermediate support walls 44, respectively, and the idler support shaft 22 is fixed so as to extend across the second gear mechanism accommodating chamber 42 in the device width direction. That is, the left end of the idler support shaft 22 is fitted in a circular recess formed in the left intermediate support wall 44, and the right end of the idler support shaft 22 is fitted in a circular through hole formed in the right intermediate support wall 44. Moreover, an idler shaft end pressing member 38 is attached so as to cover an opening located on the axial (the device width direction) end side of the right circular through hole, whereby the idler support shaft 22 is pressed so as not to come off in the axial direction (to the right). In the present embodiment, the idler support shaft 22 corresponds to a second common support shaft in the present invention.

The idler inner peripheral bearings 33 are radial bearings that are respectively provided between the outer peripheral surface of the idler support shaft 22 and the inner peripheral surfaces of the idler gears 12*l*, 12*r*, for rotatably supporting the idler gears 12*l*, 12*r* on the idler support shaft 22. Idler inner peripheral bearings 33 are provided for the left and right idler gears 12*l*, 12*r*, respectively. Thus, the idler inner peripheral bearings 33 are respectively provided on the inner peripheral surfaces of the left idler gear 12*l* and the right idler gear 12*r*, whereby the left and right idler gears 12*l*, 12*r* are rotatablly supported on the common idler support shaft 22 independently of each other. The axial width of each idler inner peripheral bearing 33 is set to be equal to or smaller than the width of each idler gear 12*l*, 12*r*. For example, radial needle bearings or the like are preferably used as the idler inner peripheral bearings 33.

Moreover, as specifically shown in FIG. 4, a thrust bearing 39 is provided between the left and right idler gears 12*l*, 12*r*, and between each idler gear 12*l*, 12*r* and the intermediate support wall 44 of the case DC. Thus, a predetermined gap is held between the left and right idler gears 12*l*, 12*r* provided adjacent to each other, and between each idler gear 12*l*, 12*r* and the intermediate support wall 44 of the case DC, and the left and right idler gears 12*l*, 12*r* become rotatable relative to each other, and relative to the intermediate support wall 44 of the case DC. Note that, for example, in addition to thrust ball bearings or thrust needle bearings, thrust washers as slide bearings, or the like can be used as the thrust bearings 39.

As described above, the idler gears 12*l*, 12*r* have an inner-diameter support structure in which the idler gears 12*l*, 12*r* are rotatably supported on the idler support shaft 22 through the idler inner peripheral bearings 33 that are provided on the inner peripheries of the idler gears 12*l*, 12*r*. Thus, as opposed to the case where the left and right idler gears 12*l*, 12*r* have an outer-diameter support structure in which the outer periphery of a rotation shaft is supported by bearings at both ends of each idler gear 12*l*, 12*r*, members (e.g., bearings) for supporting shaft of each idler gear is not need between the left and right idler gears 12*l*, 12*r*, and thus, the left and right idler gears 12*l*, 12*r* can be provided adjacent to each other in the axial direction. Thus, the case DC is structured to accommodate the left and right idler gears 12*l*, 12*r* in common in the second gear mechanism accommodating chamber 42 which is a single space having no intermediate support structure for supporting shaft of each idler gear between the left and right idler gears 12*l*, 12*r*. Moreover, since the idler support shaft 22 is fixed to the case DC, the support structure for the idler support shaft 22 can be significantly simplified. Thus, the axial (the device width direction) dimension for providing the idler gears 12*l*, 12*r* can be significantly reduced, whereby the dimension of the vehicle drive device D in the width direction can be reduced.

The left and right counter deceleration mechanisms 13*l*, 13*r* are supported on the outer periphery of the counter support shaft 23 which is supported by the case DC and is common to the left and right systems, so that the left and right counter deceleration mechanisms 13*l*, 13*r* are rotatable independently of each other. In this case, the left and right counter deceleration mechanisms 13*l*, 13*r* are supported by the counter support shaft 23 through respective counter inner peripheral bearings 34, which are respectively provided on the inner peripheries of the counter deceleration mechanisms 13*l*, 13*r*, so that the left and right counter deceleration mechanisms 13*l*, 13*r* are rotatable independently of each other. The counter support shaft 23 is herein fixed to the case DC so that the counter support shaft 23 does not rotate. More specifically, both ends of the counter support shaft 23 are supported by the left and right sidewalls 44 of the case DC, respectively, and the counter support shaft 23 is fixed so as to extend across the first gear mechanism accommodating chamber 41 in the device width direction. That is, the left end of the counter support shaft 23 is fitted in a circular recess formed in the left sidewall 45, and the right end of the counter support shaft 23 is fitted in a circular through hole formed in the right sidewall 45. Moreover, a counter shaft end pressing member 38 is attached so as to close the right circular through hole, whereby the counter support shaft 23 is pressed so as not to come off in the axial direction (to the right). In the present embodiment, the counter support shaft 23 corresponds to a common support shaft in the present invention.

The counter inner peripheral bearings 34 are radial bearings that are respectively provided between the outer peripheral surface of the counter support shaft 23 and the inner peripheral surfaces of the counter deceleration mechanisms 13*l*, 13*r*, for rotatably supporting the counter deceleration mechanisms 13*l*, 13*r* on the counter support shaft 23. The inner peripheral surface of the counter deceleration mechanism 13*l* herein indicates the inner peripheral surface of the first gear 14*l* and the second gear 15*l* of the counter deceleration mechanism 13*l*, and a cylindrical hub portion that connects the first gear 14*l* and the second gear 15*l* in the axial direction. The inner peripheral surface of the counter deceleration mechanism 13*r* herein indicates the inner peripheral surface of the first gear 14*r* and the second gear 15*r* of the counter deceleration mechanism 13*r*, and a cylindrical hub portion that connects the first gear 14*r* and the second gear 15*r* in the axial direction. Counter inner peripheral bearings 34 are provided for the left and right counter deceleration mechanisms 13*l*, 13*r*, respectively. Thus, the counter inner peripheral bearings 34 are respectively provided on the inner peripheral surfaces of the left counter deceleration mechanism 13*l* and the right counter deceleration mechanism 13*r*, whereby the left and right counter deceleration mechanisms 13*l*, 13*r* are supported by the common counter support shaft 23, so that the left and right counter deceleration mechanisms 13*l*, 13*r* are rotatable independently of each other. In the present embodiment, two counter inner peripheral bearings 34 are axially arranged for each of the left and right counter deceleration mechanisms 13*l*, 13*r*. This structure enables the counter deceleration mechanisms 13*l*, 13*r*, which are longer than the idler gears 12*l*, 12*r* in the axial direction, to be appropriately supported and reducing the number of kinds of parts by using the same bearings as that for the idler gears 12*l*, 12*r*. The total width of the two counter inner peripheral bearings 34 arranged in the axial direction is set to be equal to or smaller than the width of each counter deceleration mechanism 13*l*, 13*r*. The same Bearings are used for the idler inner peripheral bearings 33 and the counter inner peripheral bearings 34, and for example, radial needle bearings or the like are preferably used as the counter inner peripheral bearings 34.

Moreover, as specifically shown in FIG. 4, a thrust bearing 39 is provided between the left and right counter deceleration mechanisms 13*l*, 13*r*, and between each counter deceleration mechanism 13*l*, 13*r* and the sidewall 45 of the case DC. Thus, a predetermined gap is held between the left and right counter deceleration mechanisms 13*l*, 13*r* provided adjacent to each other, and between each counter deceleration mechanism 13*l*, 13*r* and the sidewall 45 of the case DC, and the left and right counter deceleration mechanisms 13*l*, 13*r* become rotatable relative to each other, and relative to the sidewall 45 of the case DC. Note that, bearings of various structures similar to those described above can be used as the thrust bearings 39.

As described above, the counter deceleration mechanisms 13*l*, 13*r* have an inner-diameter support structure in which the counter deceleration mechanisms 13*l*, 13*r* are rotatably supported on the counter support shaft 23 through the counter inner peripheral bearings 34 that are provided on the inner peripheries of the counter deceleration mechanisms 13*l*, 13*r*. Thus, as opposed to the case where the left and right counter deceleration mechanisms 13*l*, 13*r* have an outer-diameter support structure in which the outer periphery of a rotation shaft is supported by bearings at both ends of each counter deceleration mechanism 13*l*, 13*r*, members (e.g., bearings) supporting shaft of each idler gear is not needed between the left and right counter deceleration mechanisms 13*l*, 13*r*, and thus, the left and right counter deceleration mechanisms 13*l*, 13*r* can be provided adjacent to each other in the axial direction. Thus, the case DC is structured to accommodate the left and right counter deceleration mechanisms 13*l*, 13*r* in common in the first gear mechanism accommodating chamber 41 which is a single space having no intermediate support structure for supporting a shaft of each idler gear between the left and right counter deceleration mechanisms 13*l*, 13*r*. Moreover, since the counter support shaft 23 is fixed to the case DC, the support structure for the counter support shaft 23 can be significantly simplified. Thus, the axial (the device width direction) dimension for providing the counter deceleration mechanisms 13*l*, 13*r* can be significantly reduced, whereby the dimension of the vehicle drive device D in the width direction can be reduced.

3. Direction of the Tooth Surface of Each Gear

The direction of the tooth surface of each gear of the driving-force transmission systems will be described below. In the present embodiment, helical gears are used as the MG output gears 11*l*, 11*r*, the idler gears 12*l*, 12*r*, the first gears 14*l*, 14*r* and the second gears 15*l*, 15*r* of the counter deceleration mechanisms 13*l*, 13*r*, and the drive output gears 16*l*, 16*r*. When helical gears are used as a driving-force transmission mechanism, a thrust force, which is an axial force, is applied to each gear according to the tilted direction of the tooth surface. In this case, the right rotor shaft 21*r* using an outer-diameter support structure is capable of supporting a thrust force that is applied to the MG output gear 11*r* by the rotor bearings 31, 32, and the left rotor shaft 21*l* is capable of supporting a thrust force that is applied to the MG output gear 11*l* by the rotor bearings 31, 32. Moreover, the output shaft Or having an outer-diameter support structure is also capable of supporting a thrust force that is applied to the drive output gear 16*r* by the output bearings 35, 36, and the output shaft Ol is capable of supporting a thrust force that is applied to the drive output gear 16*l* by the output bearings 35, 36. In the idler gears 12*l*, 12*r* and the counter deceleration mechanisms 13*l*, 13*r* using an inner-diameter support structure, on the other hand, since no thrust force can be supported by the idler inner peripheral bearings 33 or the counter inner peripheral bearings 34, the thrust bearings 39 are provided as described above. Thus, in order to reduce the load on such thrust bearings 39, the tilted direction of the tooth surface of each gear is set so that a thrust force that is applied to the idler gears 12*l*, 12*r* and the counter deceleration mechanisms 39 has a predetermined direction.

In FIG. 4, the direction of a thrust force that is applied to each gear in the state where a forward driving force is transmitted from the motor-generators MGl, MGr to the output shafts Ol, Or, that is, in the forward-driving-force transmitting state, is shown by arrows. More specifically, in FIG. 4, the respective directions of a thrust force that is applied to the left and right idler gears 12*l*, 12*r*, and a thrust force the is applied as its reaction force to the first gears 14*l*, 14*r* are shown by arrow "f1," and the respective directions of a thrust force that is applied to the second gears 15*l*, 15*r*, and a thrust force that is applied as its reaction force to the drive output gears 16*l*, 16*r* are shown by arrow "f2."

In the left and right idler gears 12*l*, 12*r*, the tilted direction of the tooth surface of each gear is set so that the thrust forces f1 that are respectively applied to the left and right idler gears 12*l*, 12*r* in the forward-driving-force transmitting state have directions opposing to each other. That is, the respective tilted directions of the tooth surfaces of the left and right idler gears 12*l*, 12*r* are set so that, in the forward-driving-force transmitting state, the thrust force f1 that is applied to the left idler gear 12*l* has a direction toward the right idler gear 12*r*, and the thrust force f1 that is applied to the right idler gear 12*r* has a direction toward the left idler gear 12*l*. More specifically, the respective tilted directions of the tooth surfaces of the left and right idler gears 12*l*, 12*r* are set so that the tooth surface of each idler gear 12*l*, 12*r* is located more forward of the forward-driving-force transmitting direction toward the other idler gear 12*l*, 12*r* (toward the center in the width direction). Thus, the respective tilted directions of the tooth surfaces of the left and right idler gears 12*l*, 12*r* are opposite to each other. Moreover, in the present embodiment, the tooth surfaces of the left idler 12*l* and the right idler 12*r* are set to have the same tilted angle.

The reason why the tilted directions of the tooth surfaces are set based on the forward-driving-force transmitting state is because this state is a state which generally occurs most often as the vehicle drive device D, and in which a large driving force is output also from the motor-generators MGl, MGr. By setting the respective tilted directions of the tooth surfaces of the idler gears 12*l*, 12*r* in the manner described above, the thrust forces that are respectively applied to the left and right idler gears 12*l*, 12*r* act in such a direction that the thrust forces cancel each other, in the state which occurs most often as the vehicle drive device D and in which a large driving force is output. In this case, the thrust forces f1 are supported mainly by the thrust bearing 39 provided between the left and right idler gears 12*l*, 12*r*. This can significantly reduce the load on the thrust bearings 39 respectively provided between the case DC and the left and right idler gears 12*l*, 12*r*. Thus, since the load on the thrust bearings 39 can be reduced in the overall support structure of the idler gears 12*l*, 12*r*, the size of the thrust bearings 39 can be reduced. Note that, when a rearward driving force is transmitted from the motor-generators MGl, MGr to the output shafts Ol, Or, and when a driving force is transmitted from the output shafts Ol, Or to the motor-generators MGl, MGr in order to perform regenerative braking during forward traveling of the vehicle, thrust forces of the directions away from each other, that is, the directions opposite to those shown in the figure, are applied to the left and right idler gears 12*l*, 12*r*, respectively. In this case, the thrust forces are supported mainly by the thrust bearings 39 respectively provided between the case DC and the left and right idler gears 12*l*, 12*r*.

In the left and right counter deceleration mechanisms 13*l*, 13*r*, the tilted direction of the tooth surface of each gear is set so that the thrust forces f2 that are respectively applied to the left and right second gears 15*l*, 15*r* have directions facing each other, and the thrust forces f1 that are applied to the left and right first gears 14*l*, 14*r* have directions away from each other, in the forward-driving-force transmitting state. That is, the respective tilted directions of the tooth surfaces of the left and right second gears 15*l*, 15*r* are set so that, in the forward-driving-force transmitting state, the thrust force f2 that is applied to the left second gear 15*l* has a direction toward the right second gear 15*r*, and the thrust force f2 that is applied to the right second gear 15*r* has a direction toward the left second gear 15*l*. Moreover, the respective tilted directions of the tooth surfaces of the left and right first gears 14*l*, 14*r* are set so that, in the forward-driving-force transmitting state, the thrust force f1 that is applied to the left first gear 14*l* has a direction toward the opposite side to the right first gear 14*r*, and the thrust force f1 that is applied to the right first gear 14*r* has a direction toward the opposite side to the left first gear 14*l*. More specifically, the respective tilted directions of the tooth surfaces of the left and right second gears 15*l*, 15*r* are set so that the tooth surface of each second gear 15*l*, 15*r* is located more forward of the forward-driving-force transmitting direction toward the other second gear 15*l*, 15*r* (toward the center in the width direction). Moreover, the respective tilted directions of the tooth surfaces of the left and right first gears 14*l*, 14*r* are set so that the tooth surfaces of the left and right first gears 14*l*, 14*r* appropriately mesh with the tooth surfaces of the left and right idler gears 12*l*, 12*r*, respectively. That is, the respective tilted directions of the tooth surfaces of the left and right first gears 14*l*, 14*r* are set so that the tooth surface of each first gear 14*l*, 14*r* is located more forward of the forward-driving-force transmitting direction toward the other first gear 14*l*, 14*r* (toward the center in the width direction). Moreover, in the present embodiment, the tooth surfaces of the left first gear 14*l* and the right first gear 14*r* are set to have the same tilted angle, and the tooth surfaces of the left second gear 15*l* and the right second gear 15*r* are set to have the same tilted angle.

Since the rotation of the second gears 15*l*, 15*r* is decelerated with respect to that of the first gears 14*l*, 14*r* as described above, the driving force that is transmitted by the second gears 15*l*, 15*r* is larger than the driving force that is transmitted by the first gears 14*l*, 14*r*. Moreover, since the thrust force that is applied to each gear is proportional to the magnitude of the driving force that is transmitted by each gear, the thrust forces f2 that are respectively applied to the second gears 15*l*, 15*r* are larger than the thrust forces f1 that are respectively applied to the first gears 14*l*, 14*r*. Thus, when considered as a whole in the counter deceleration mechanisms 13*l*, 13*r* where the first gears 14*l*, 14*r* and the second gears 15*l*, 15*r* are integrated, thrust forces f3 (=f2−f1) are applied in the same direction as that of the thrust forces f2 that are applied to the second gears 15*l*, 15*r*. Thus, by setting the respective tilted directions of the tooth surfaces of the first gears 14*l*, 14*r* and the second gears 15*l*, 15*r* in the manner described above, the thrust forces f3 that are applied to the left and right counter deceleration mechanisms 13*l*, 13*r* act in such a direction that the thrust forces f3 cancel each other, in the forward-driving-force transmitting state which occurs most often as the vehicle drive device D and in which a large driving force is output. In this case, the thrust forces f3 are supported mainly by the thrust bearing 39 provided between the left and right counter deceleration mechanisms 13l, 13r. This can significantly reduce the load on the thrust bearings 39 respectively provided between the case DC and the left and right counter deceleration mechanisms 13l, 13r. Thus, since the load on the thrust bearings 39 can be reduced in the overall support structure of the counter deceleration mechanisms 13l, 13r, the size of the thrust bearings 39 can be reduced. Note that, when a rearward driving force is transmitted from the motor-generators MGl, MGr to the output shafts Ol, Or, and when a driving force is transmitted from the output shafts Ol, Or to the motor-generators MGl, MGr in order to perform regenerative braking during forward traveling of the vehicle, thrust forces of the directions away from each other, that is, the directions opposite to those shown in the figure, are applied to the left and right counter deceleration mechanism 13l, 13r, respectively. In this case, the thrust forces are supported mainly by the thrust bearings 39 respectively provided between the case DC and the left and right counter deceleration mechanisms 13l, 13r.

4. Other Embodiments (1) The above embodiment was described with respect to an example in which the vehicle drive device D of the present invention is applied to a drive device for electric vehicles, for driving left and right driving wheels which are the front or rear wheels of a vehicle. However, embodiments of the present invention are not limited to this. Thus, for example, the vehicle drive device D of the present invention can be applied to both front and rear wheels of a vehicle as a drive device for four-wheel drive vehicles. In this case, respective drive devices for the front wheels and the rear wheels may be provided as separate bodies, or may be accommodated in a single case so as to be structured integrally. The vehicle drive device D of the present invention can be applied to a vehicle whose front or rear wheels are driven by an engine (an internal combustion engine) or by both the engine and a rotating electrical machine, so that the remaining wheels, which are driven by neither the engine nor the rotating electrical machine, are driven by the vehicle drive device D of the present invention. In this case, the vehicle drive device D of the present invention is a drive device for hybrid vehicles.

(2) The above embodiment was described with respect to an example in which the idler gears 12l, 12r connect the MG output gears 11l, 11r and the counter deceleration mechanisms 13l, 13r to each other so that the driving force is transmitted therebetween, respectively. However, embodiments of the present invention are not limited to this. Thus, for example, it is also one of preferred embodiments of the present invention to structure a vehicle drive device D having other drive transmission mechanism, such as chains or transmission belts, instead of the idler gears 12l, 12r. It is also one of embodiments of the present invention to structure a vehicle drive device D having no idler gear 12l, 12r or no corresponding drive transmission mechanism, so that the MG output gear 11r and the first gear 14r of the counter deceleration mechanism 13r are drivingly connected so as to mesh directly with each other, and the MG output gear 11l and the first gear 14l of the counter deceleration mechanism 13l are drivingly connected so as to mesh directly with each other. Such a structure is possible, for example, when total of a diameter of the MG output gears 11l, 11r and a diameter of the first gears 14l, 14r is larger than a diameter of motor-generators MGl, MGr.

(3) The above embodiment was described with respect to an example in which the counter deceleration mechanism 13r is structured so that the right second gear 15r is provided at the position that is more proximal to the driving wheel Wr than the right first gear 14r is, and the counter deceleration mechanism 13l is structured so that the left second gear 15l is provided at the position that is more proximal to the driving wheel Wl than the left first gear 14l is. However, embodiments of the present invention are not limited to this. Thus, it is one of embodiments of the present invention to structure the counter deceleration mechanism 13r so that the right first gear 14r is provided at the position that is more proximal to the driving wheel Wr than the right second gear 15r is, and to structure the counter deceleration mechanism 13l so that the left first gear 14l is provided at the position that is more proximal to the driving wheel Wl than the left second gear 15l is. This structure enables the drive output gears 16l, 16r to be provided closer to the center in the device width direction than in the structure of the above embodiment. Thus, a longer distance can be ensured from the output shafts Ol, Or to the driving wheels Wl, Wr.

(4) The above embodiment was described with respect to an example in which the idler gears 12l, 12r and the counter deceleration mechanisms 13l, 13r of the drive transmission systems Tl, Tr have an inner-diameter support structure in which the left and right gear mechanisms are supported by a common support shaft, which is supported by the case DC, through bearings provided in the inner peripheries of the gear mechanisms, so that the left and right gear mechanisms are rotatable independently of each other. However, embodiments of the present invention are not limited to this. Thus, it is also one of embodiments of the present invention that one or both of the idler gears 12l, 12r and the counter deceleration mechanisms 13l, 13r have an outer-diameter support structure in which each shaft is rotatably supported by the case DC. Moreover, the above embodiment was described with respect to an example in which the rotor shafts 21l, 21r of the motor generators MGl, MGr and the output shafts Ol, Or have an outer-diameter support structure. However, it is also one of embodiments of the present invention that one or both of the rotors Rol, Ror of the motor generators MGl, MGr and the output shafts Ol, Or have an inner-diameter support structure.

(5) The above embodiment was described with respect to an example in which the left motor-generator MGl, the left drive transmission system Tl, and the left output shaft Ol of the left system, and the right motor-generator MGr, the right drive transmission system Tr, and the right output shaft Or of the right system are arranged in mirror symmetry to each other in the case DC. However, embodiments of the present invention are not limited to this. Thus, it is also one of preferred embodiments of the present invention to provide the left system and the right system so that corresponding shafts of the left system and the right system are located at different positions from each other.

(6) The above embodiment was described with respect to an example in which helical gears are used as the gears. However, embodiments of the present invention are not limited to this. Thus, it is also one of preferred embodiments of the present invention to use gears other than the helical gears, such as, for example, spur gears or double helical gears, as the gears.

The present invention may be used as drive device for use in vehicles having a rotating electrical machine as a driving force source, such as electric vehicles and hybrid vehicles.

The invention claimed is:

1. A vehicle drive device, characterized by comprising:
two independent systems provided for two driving wheels, respectively, each system including
a rotating electrical machine,
an output member to be connected to a corresponding driving wheel, and a drive transmission system which includes a counter deceleration mechanism, and which connects the rotating electrical machine and the output member to each other so that driving force is transmitted;

a case integrally accommodating the rotating electrical machines, the output members, and the drive transmission systems of the two systems, wherein the rotating electrical machine, the output member, and the counter deceleration mechanism of each system are provided so that their respective rotation axes are parallel to each other, and are positioned so as to overlap each other in the rotation axis direction, and the rotating electrical machine of each system is provided with an output portion located on one side of the rotating electrical machine which is distal from the corresponding driving wheel in the rotation axis direction of the rotating electrical machine, the counter deceleration mechanism of each system has a first gear and a second gear which are rotating integrally with each other, the first gear is connected to the output portion of the rotating electrical machine so that driving force is transmitted, and the second gear is provided at a position that is more proximal to the corresponding driving wheel than the first gear is in the rotation axis direction of the counter deceleration mechanism, and is connected to the output member.

2. The vehicle drive device according to claim 1, wherein the rotating electrical machine, the output member, and the drive transmission system of one system, and the rotating electrical machine, the output member, and the drive transmission system of the other system are arranged in mirror symmetry to each other in the case.

3. The vehicle drive device according to claim 2, wherein the two systems are arranged adjacent to each other.

4. The vehicle drive device according to claim 3, wherein the output portions of the two systems are provided adjacent to each other.

5. The vehicle drive device according to claim 4, wherein the rotational axes of the rotating electrical machines in the two systems are provided coaxially.

6. The vehicle drive device according to claim 5, wherein the first gear and the second gear are provided adjacent to each other.

7. The vehicle drive device according to claim 6, wherein the output portion of the rotating electrical machine of each system has a rotating electrical machine output gear that rotates integrally with a rotor shaft of the rotating electrical machine, and the drive transmission system of each system has an idler gear for connecting the rotating electrical machine output gear and the first gear to each other so that driving force is transmitted.

8. The vehicle drive device according to claim 7, wherein the idler gear of each system is provided between the rotating electrical machines in the two systems in such a manner that at least a portion of the idler gear overlaps the rotating electrical machine when viewed in an axial direction of the rotating electrical machine.

9. The vehicle drive device according to claim 8, wherein the idler gear meshes with the rotating electrical machine output gear and the first gear.

10. The vehicle drive device according to claim 9, wherein the rotating electrical machine output gear, the idler gear, and the first gear of one system are provided adjacent to the rotating electrical machine output gear, the idler gear, and the first gear of the other system, respectively.

11. The vehicle drive device according to claim 10, wherein the rotating electrical machine output gear, the idler gear, and the first gear of each system are arranged on a plane that is perpendicular to respective rotation axes of the rotating electrical machine output gear.

12. The vehicle drive device according to claim 11, wherein the second gear of each system meshes with a drive output gear that rotates integrally with the output member.

13. The vehicle drive device according to claim 12, wherein the output member of each system is supported by the case by a first output bearing and a second output bearing which are provided at different positions in the rotation axis direction of the output member, and the first output bearing is positioned on a plane which is perpendicular to an axis of the output member, and on which the first gear is present.

14. The vehicle drive device according to claim 13, wherein the second output bearing of each system is positioned radially inside an outer peripheral surface of a drive output gear which is connected to the output member so as to rotate integrally with the output member, and the second output bearing is positioned on a plane which is perpendicular to the axis of the output member, and on which the drive output gear is present.

15. The vehicle drive device according to claim 14, wherein the rotor shaft of the rotating electrical machine of each system is supported by the case by a rotor bearing, and the rotor bearing is positioned radially inside a stator of the rotating electrical machine, and is positioned on a plane which is perpendicular to the axis of the rotating electrical machine, and on which a coil end portion of the stator is present.

16. The vehicle drive device according to claim 15, wherein the counter deceleration mechanisms of the two systems, which are respectively included in the drive transmission systems of the two systems, are supported on an outer periphery of a common shaft supported by the case, so that the counter deceleration mechanisms are rotatable independently of each other.

17. The vehicle drive device according to claim 16, wherein the idler gears of the two systems, which are respectively included in the drive transmission systems of the two systems, are supported on an outer periphery of a common shaft supported by the case, so that the idler gears are rotatable independently of each other.

18. The vehicle drive device according to claim 1, wherein the two systems are arranged adjacent to each other.

19. The vehicle drive device according to claim 1, wherein the output portions of the two systems are provided adjacent to each other.

20. The vehicle drive device according to claim 1, wherein the rotational axes of the rotating electrical machines in the two systems are provided coaxially.

21. A vehicle drive device, characterized by comprising:

two independent systems provided adjacent to each other, each of which is connected to a corresponding driving wheel so that driving force is transmitted, respectively, each system including a rotating electrical machine, an output member to be connected to the corresponding driving wheel, and a drive transmission system for drivingly connecting the rotating electrical machine and the output member;

wherein the rotating electrical machine, the output member, and a counter deceleration mechanism included in the drive transmission system of each system are provided so that their respective rotation axes are parallel to each other, and are positioned so as to be on a plane that is perpendicular to the rotation axis of the rotating electrical machine, the rotating electrical machine of each system has an output portion which is provided on one side of the rotating electrical machine which is proximal to the adjacent other system in the rotation axis direction of the rotating electrical machine, the counter deceleration mechanism of each system has a first gear and a second gear which are rotating integrally with each other.

the first gear is connected to the output portion of the rotating electrical machine so that driving force is transmitted, and the second gear is provided at a position that is more proximal to the corresponding driving wheel than the first gear is in the rotation axis direction of the counter deceleration mechanism, and is connected to the output member.

\* \* \* \* \*